US005497735A

United States Patent [19]

Kern et al.

[11] Patent Number: 5,497,735

[45] Date of Patent: Mar. 12, 1996

[54] INTERNAL COMBUSTION ENGINE FOR PORTABLE POWER GENERATING EQUIPMENT

[75] Inventors: Robert Kern, Waukesha; Gerald Ruehlow, Oconomowoc; Herb Hoenisch; Mark Sarder, both of Waukesha, all of Wis.

[73] Assignee: Generac Corporation, Waukesha, Wis.

[21] Appl. No.: 254,657

[22] Filed: Jun. 3, 1994

Related U.S. Application Data

[62] Division of Ser. No. 95,821, Jul. 21, 1993, Pat. No. 5,317,999, which is a continuation of Ser. No. 897,369, Jun. 11, 1992, abandoned.

[51] Int. Cl.[6] .............................. F01L 1/047; F16H 53/00

[52] U.S. Cl. .............................................. 123/90.6; 74/567

[58] Field of Search .............................. 123/90.6; 74/567; 29/888.1

[56] References Cited

U.S. PATENT DOCUMENTS 5,065,720 11/1991 Nishiyama et al. ............... 123/90.6 X
5,136,780 8/1992 Hishida ................................. 74/567 X

FOREIGN PATENT DOCUMENTS 4029026 3/1992 Germany .............................. 29/888.1

OTHER PUBLICATIONS

"Camshafts Made from Non-metallic Materials for Small Engines" by Robert K. Mitchell, SAE Paper No. 861243, Sep. 1986.

*Primary Examiner*—Tony M. Argenbright
*Attorney, Agent, or Firm*—Reinhart, Boerner, Van Deuren, Norris & Rieselbach

[57] ABSTRACT

An internal combustion engine for portable power generating equipment includes a camshaft assembly having an integral oil pump at one end thereof. The camshaft, which is preferably formed of two dissimilar materials, is mounted for axial movement in response to increased oil pressure so as to provide automatic oil pressure regulation. Structure is provided for reducing engine compression at low speeds to reduce cranking resistance during starting. Speed control is provided by a stepper motor coupled through a cam to the engine throttle. The cam is shaped so as to counteract the non-linear relationship between throttle position and engine power and speed so as to provide a desired relationship between the position of the stepper motor and the engine power and speed.

1 Claim, 4 Drawing Sheets

INTERNAL COMBUSTION ENGINE FOR PORTABLE POWER GENERATING EQUIPMENT

This is a divisional of application Ser. No. 08/095,821 filed on Jul. 21, 1993, now U.S. Pat. No. 5,317,999, which is a File Wrapper Continuation application of Ser. No. 07/897,369, filed Jun. 11, 1992, now abandoned.

BACKGROUND OF THE INVENTION

This invention relates generally to internal combustion engines and, more particularly, to internal combustion engines for portable power generating equipment.

Portable power generating equipment typically consists of an internal combustion engine coupled to an electrical generator or alternator. Typically, general purpose internal combustion engines are used in portable power generating equipment. Such service however imposes a number of peculiar requirements on the engines that are so used. Accordingly, it is desireable to design engines specifically for use in portable power generators.

Two important design criteria are engine size and weight. The versatility, and hence the overall value, of a portable power generator is improved by reducing its size and weight. Because the engine makes up a significant portion of the overall size and weight of the generator, significant improvement can be realized by reducing the size and weight of the engine.

Another important design criterion is speed control. In prior generators, wherein the engine ran at a fixed constant speed in order to provide a desired constant output frequency, precise speed control, except at the desired constant speed, was relatively unimportant. In more recent designs, such as that shown for example in the co-pending application of Kern, et al. entitled "Engine-Driven Generator," the specification of which is incorporated by reference herein, the output frequency is independent of engine speed, and engine speed is determined by an electronic control. This requires that precise speed control be available over the entire range of engine speeds. In the past, it has been difficult to achieve precise speed control at low speeds where a small change in throttle position results in a large change in engine speed.

Still another design criterion is economy. As noted, the engine makes up a significant portion of a portable power generator and reflects a significant portion of its overall cost. Engines that can be economically manufactured and operated are favored.

In view of the foregoing, it is a general object of the present invention to provide a new and improved internal combustion engine for power generating equipment.

It is a further object of the present invention to provide a new and improved internal combustion engine that provides precise electronic speed control throughout substantially the entire range of the available speeds.

It is a further object of the present invention to provide an internal combustion engine that is compact, lightweight and efficient in operation.

It is a still further object of the present invention to provide an internal combustion engine that is economical in manufacture and operation.

SUMMARY OF THE INVENTION

The invention provides an internal combustion engine comprising a housing, a crankshaft mounted for rotation relative to the housing, a camshaft mounted for rotation relative to the housing, structure for coupling the crankshaft to the camshaft so that the camshaft rotates in response to rotation of the crankshaft, an outer gerotor at one end of the camshaft and moveable with the camshaft and an inner gerotor rotatably mounted on the housing in operative engagement with the outer gerotor, the outer and inner gerotors forming an oil pump operable to pump oil in response to rotation of the camshaft relative to the housing.

The invention also provides an improvement in an internal combustion engine of the type having a cylinder, a piston mounted for reciprocation within the cylinder, a crankshaft operatively coupled through a connecting rod to the piston for rotational movement in response to reciprocation of the piston, one or more valves associated with the cylinder, and a camshaft operatively coupled to the crankshaft for actuating the valve. The improvement comprises forming the camshaft in two separate pieces, the first piece being formed of a first material and defining one or more cam lobes, the second piece being formed of a dissimilar material and defining a gear for receiving motive power therethrough, the first and second pieces being joined to form a unitary structure having a cam lobe portion formed of the first material and a gear portion formed of the dissimilar material.

The invention also provides a throttle actuator for an internal combustion engine having a moveable throttle. The throttle actuator includes a stepper motor having an output shaft rotatable to predetermined angular positions in accordance with externally applied input commands and a cam operatively coupled to the output shaft of the stepper motor. The throttle actuator further comprises a cam follower engaging the cam and coupled to the throttle of the engine so that movement of the cam in response to movement of the output shaft results in movement of the throttle to vary engine speed and power. The cam is shaped so that the ratio of change in engine power to change in angular position of the output shaft of the stepper motor is substantially constant.

The invention also provides a throttle actuator for an internal combustion engine of the type having a moveable throttle for changing engine speed and power, wherein the relationship between the change in engine speed and power and the change in throttle position in non-linear. The throttle actuator comprises a stepper motor responsive to an applied input command and having an output shaft, the angular position of the output shaft being determined by the applied input command. The throttle actuator further comprises a cam coupled to the output shaft of the stepper motor for angular movement so that the angular position of the cam changes in direct proportion to changes in the angular position of the output shaft. The throttle actuator further comprises a cam follower engaging the cam and coupled to the throttle so that a change in the angular position of the cam results in movement of the throttle to effect a change in the desired engine speed/power relationship. The cam is shaped so that the relationship between the change in angular position of the cam and change in the position of the throttle is non-linear and substantially counteracts the non-linear relationship between throttle position and engine power so as to provide a substantially linear relationship between changes in the angular position in the stepper motor output shaft and the resulting changes in the load applied to the engine.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENT

Figure 1:
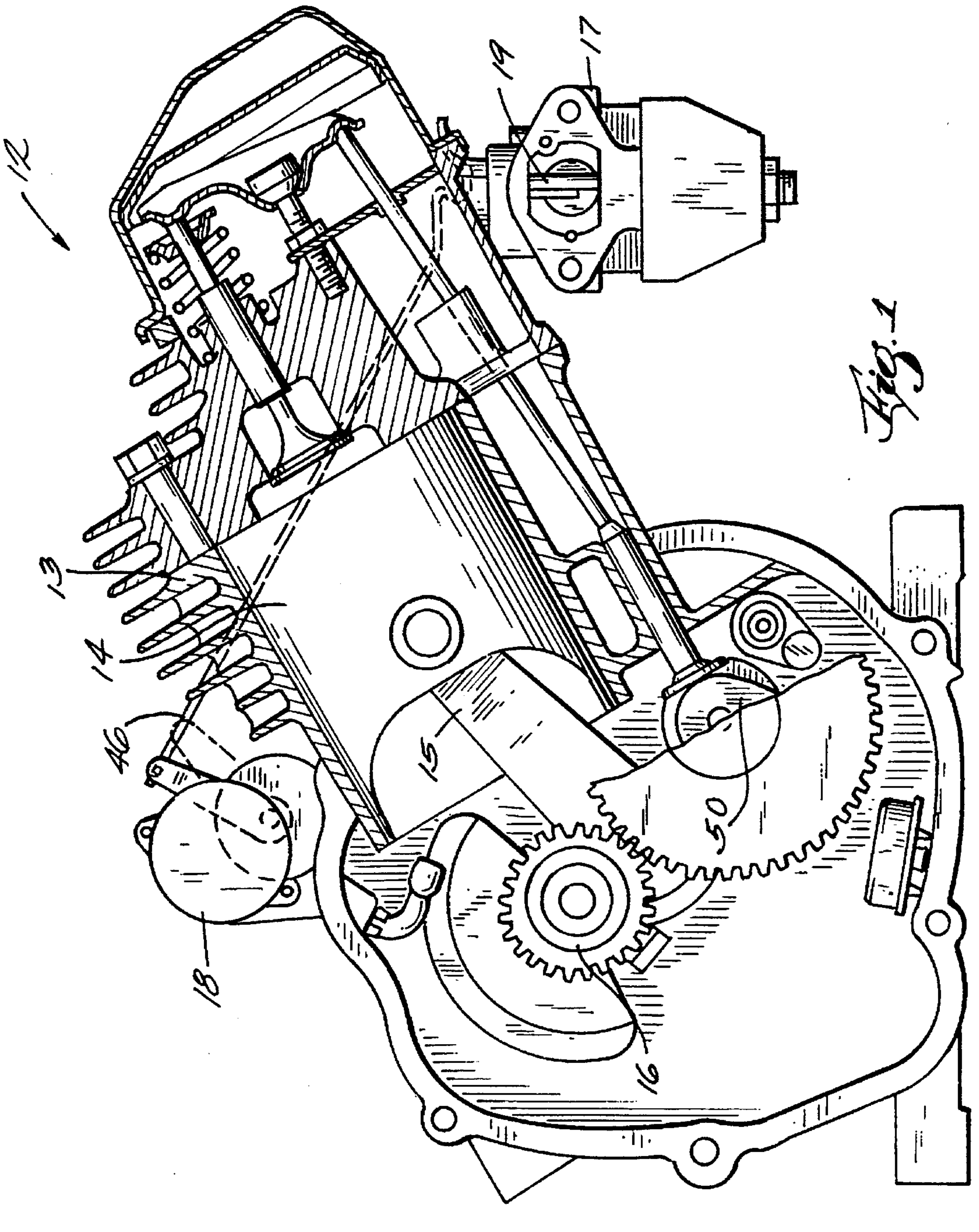
FIG. 1 is a cross sectional view of an internal combustion engine constructed in accordance with various aspects of the invention.
Figure 3:
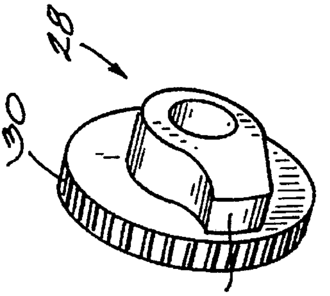
FIG. 3 is a perspective view of a cam included in the stepper motor throttle actuator assembly shown in FIG. 2.

Referring to the drawings, an internal combustion engine 12, useful for powering a power generator and embodying various features of the invention, is shown in FIG. 1. The internal combustion engine 12 comprises a four cycle, gasoline fueled, carburated engine having one or more cylinders 13. Each cylinder 13 includes a reciprocable piston 14 connected through a connecting rod 15 to a crankshaft 16. Each cylinder 13 further includes an intake valve for admitting a fuel-air mixture and an exhaust valve for venting exhaust gases following combustion. The intake and exhaust valves are actuated by means of a camshaft 50 that is rotated by means of a geared connection to the crankshaft 16. The fuel-air mixture is provided by a carburetor 17 that includes a movable throttle 19. The position of the throttle 19 regulates the amount of fuel and air admitted into the cylinders 13 and thus the speed and power developed by the engine 12.

Figure 2:
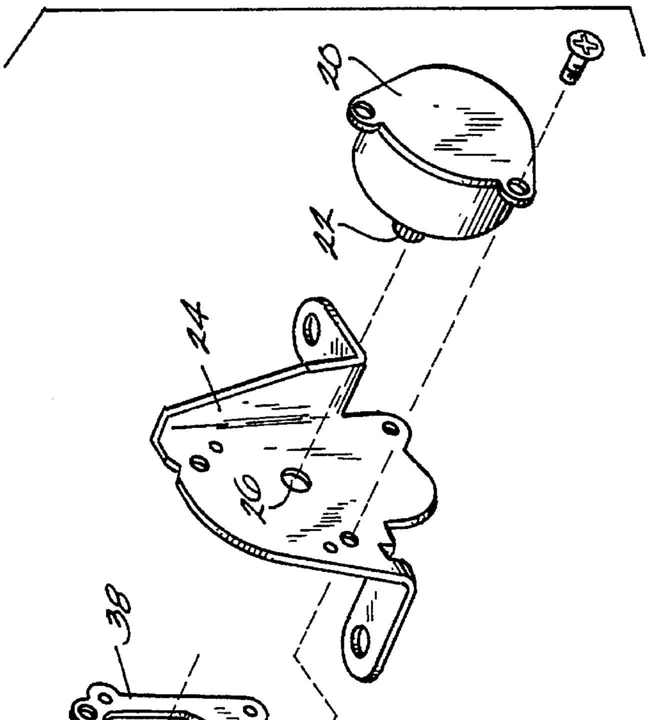
FIG. 2 is an exploded perspective view of a stepper motor throttle actuator assembly included in the internal combustion engine and constructed in accordance with one aspect of the invention.
Figure 2:
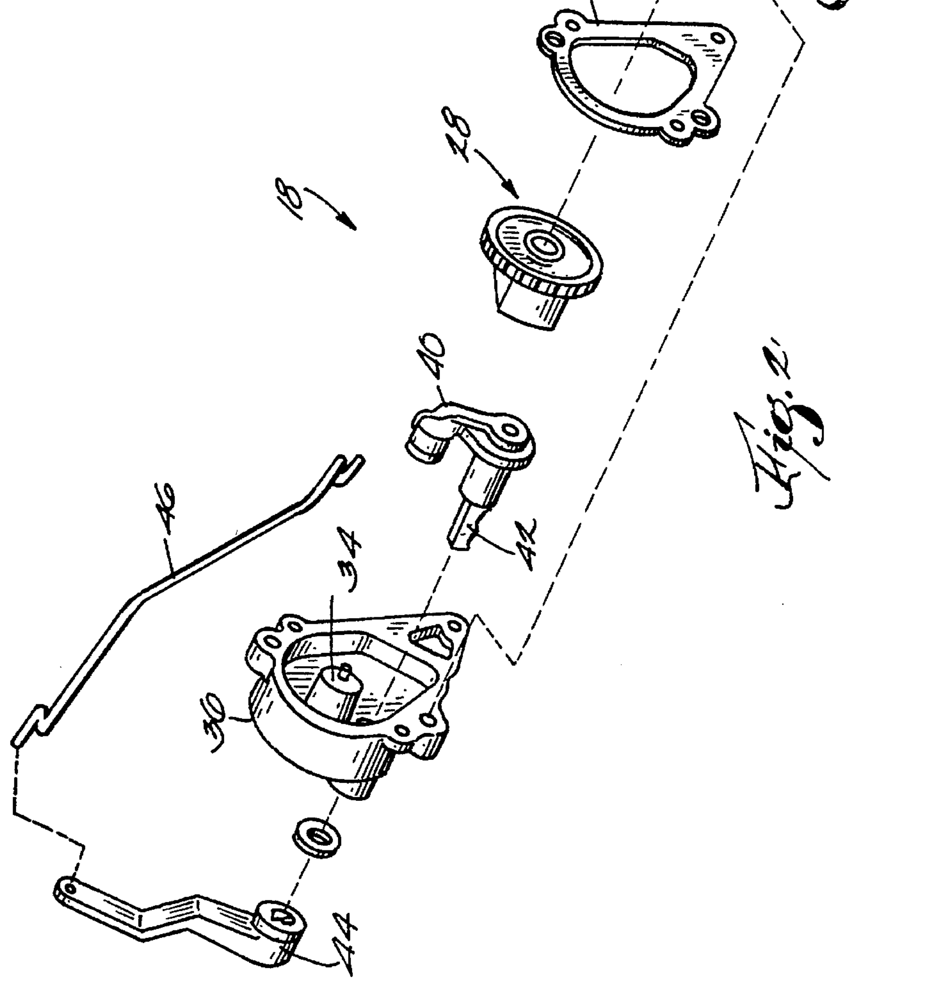

In accordance with one aspect of the invention, the internal combustion engine 12 includes a stepper motor throttle actuator 18 that functions to adjust the engine speed and power in accordance with electronic commands provided by an electronic control and regulator circuit that is included in the power generating unit with which the engine is used. Referring to FIG. 2, the throttle actuator assembly 18 includes a stepper motor 20 of known construction having a shaft and a pinion gear 22 mounted on the shaft. The stepper motor 20 is mounted onto a mounting bracket 24 that is adapted to be bolted onto the internal combustion engine 12. The pinion 22 extends through an aperture 26 in the mounting bracket 24 and engages a cam 28 that generally comprises a circular member having a toothed outer circumference 30 and a cam lobe or surface 32 formed on its rear face. The cam 28 is mounted for rotation around a cylindrical boss 34 formed in a cam housing 36 that, in turn, is adapted to be bolted onto the mounting bracket 24 to form a sealed enclosure for the cam 28. A gasket 38 between the cam housing 36 and the mounting bracket 24 helps ensure a tight seal for the cam housing 36. A cam follower 40 is mounted for pivoting movement within the cam housing 36 and is positioned so as to engage and bear against the cam surface 32. A portion 42 of the cam follower 40 projects outwardly through an aperture formed in the cam housing 36 and keys into one end of a lever arm 44, the opposite end of which is coupled through a control rod 46 to the engine throttle.

In operation, the stepper motor pinion 22 engages the teeth on the outer rim of the cam 28 so that the rotational position of the cam 28 rotates as the motor 20 rotates. As the rotational position of the cam 28 changes under the influence of the motor 20, so too does the rotational position of the cam follower 40 that bears against the cam surface 32. Rotational movement of the cam follower 40, in turn, changes the angular position of the lever arm 44. Movement of the lever arm 40, in turn, is transmitted through the control rod 46 to change the relative position of the throttle and thereby control the engine speed and power.

In accordance with one aspect of the invention, the cam surface 32 is shaped so that there is a substantially linear relationship between the angular position of the stepper motor 20 and the resulting engine speed and power. In other words, the cam surface 32 is shaped so that, for example, a single rotation of the stepper motor shaft changes the engine 12 speed and power by a fixed amount regardless of whether the engine is operating at a high, low or mid-range speed. Shaping the cam surface 32 in such a manner is necessary because the effect of a given change in throttle position on the engine speed and power varies widely according to the operating speed of the engine 12. For example, a one degree change in the angular position of the throttle will have a much greater effect on engine power when the engine is near idle than it will when the engine is operating at or near its maximum speed and power.

Although the precise shape of the cam surface 32 depends on the characteristics of a particular engine and is best determined through test and experiment, in general, the cam is shaped so that when the throttle is nearly closed, there is relatively little movement of the lever arm 44 in response to each rotation of the stepper motor pinion 22, while when the throttle is nearly open, there is greater movement of the lever arm 44 with each rotation of the stepper motor pinion 22. Once again, the goal is to obtain a substantially linear relationship between changes in the stepper motor position and changes in the engine speed and power. This permits the control and regulator circuit 16 to specify a desired, substantially predetermined change in engine speed and power merely by advancing or retarding the stepper motor 20 by a given number of steps, regardless of the absolute position of the stepper motor 20 and regardless of whether the engine 12 is operating a high, low or mid-range speed. In this manner, the throttle actuator 18 provides precise speed control over substantially the entire range of engine speeds.

Figure 4:
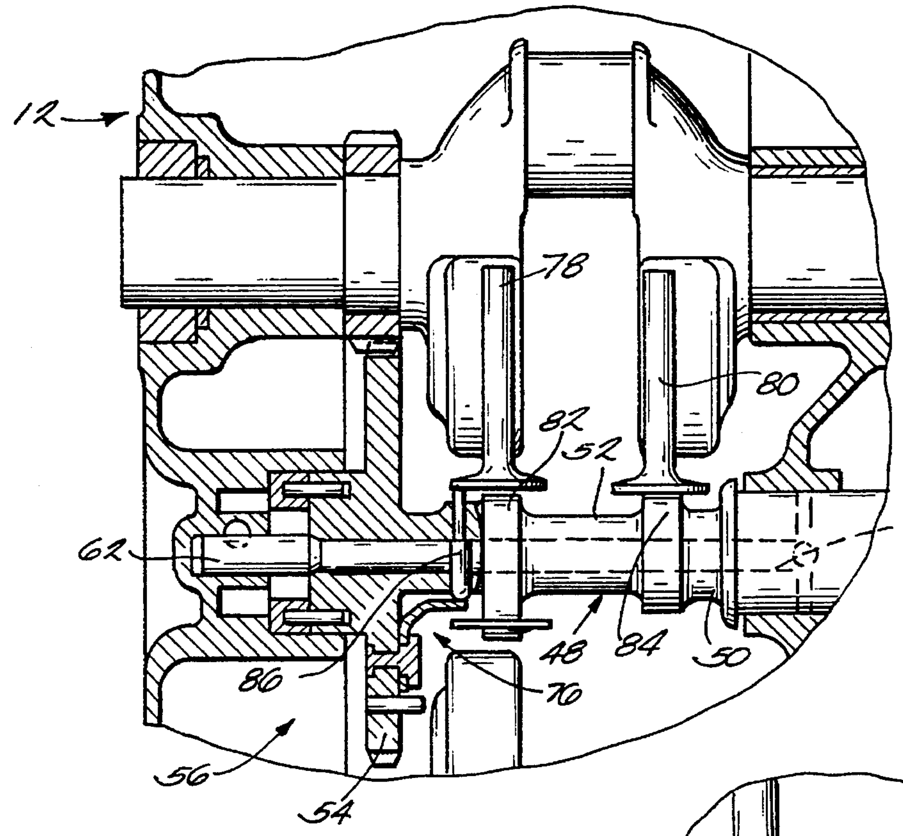
FIG. 4 is a fragmentary cross sectional view of the internal combustion engine showing a camshaft assembly having an integral oil pump in accordance with one aspect of the invention.
Figure 6:
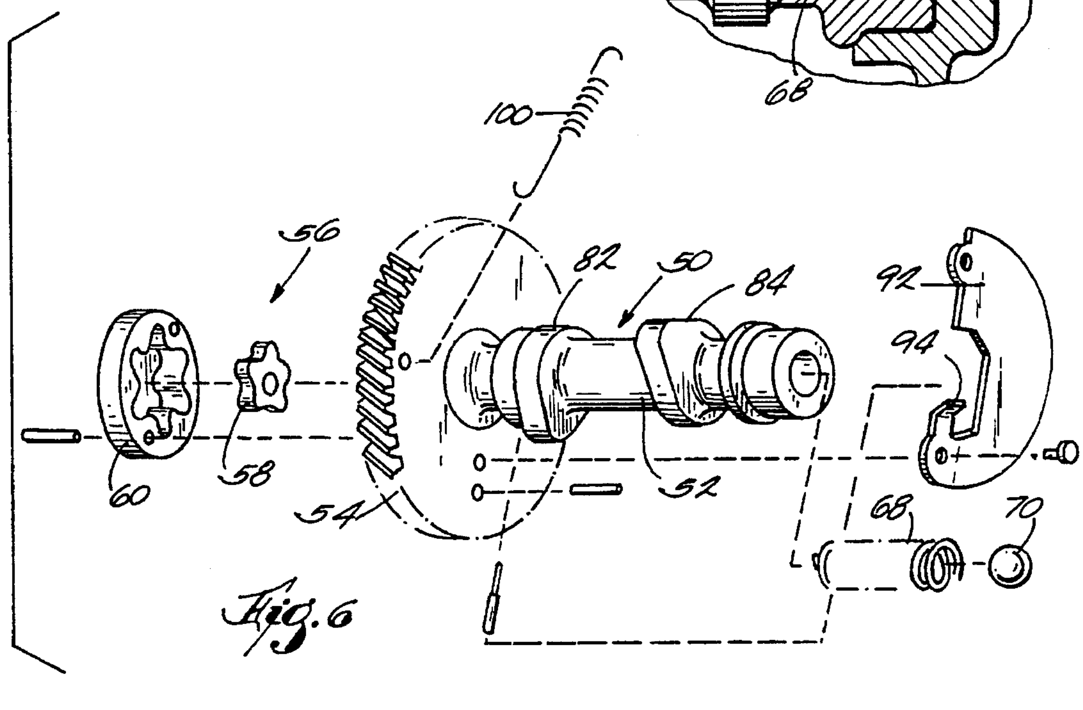
FIG. 6 is an exploded perspective view of the camshaft assembly shown in FIG. 4.

In accordance with still another aspect of the invention, the internal combustion engine 12 includes a camshaft assembly 48 having a camshaft of two piece construction, and further including an integral oil pump, a pressure regulating mechanism and an integral compression release mechanism. Referring to FIGS. 4 and 6, the camshaft assembly 48 includes a two piece camshaft 50 having a cam lobe portion 52 and a gear portion 54. Preferably, the cam lobe portion 52 and the gear portion 54 are formed of different materials. For example, The cam lobe portion 52, which is subject to considerable wear, can be machined of hardened iron while the gear portion 54 can be more economically formed of sintered powdered metal or molded plastic. This allows the camshaft 50 to be manufactured more economically than would be the case if the camshaft 50 were machined as a one piece unit and, also, provides a reduction in camshaft noise.

Figure 5:
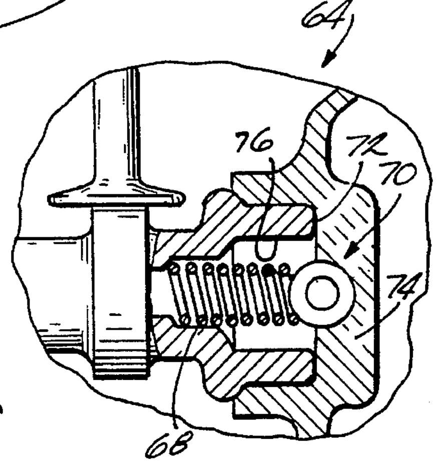
FIG. 5 is an enlarged sectional view of one portion of the camshaft assembly shown in FIG. 4 useful in understanding the construction and operation of an integral oil pressure regulating system constructed in accordance with one aspect of the invention.

In accordance with another aspect of the invention, the camshaft assembly further includes an integral oil pump. In the illustrated embodiment, the oil pump 56 comprises inner and outer gerotors 58, 60 of known construction that intermesh and, when rotated relative to each other, operate in known manner as an oil pump. The outer gerotor 60 is pinned onto the outermost face of the camshaft gear 54 so as to be rotatable with the camshaft 50. The inner gerotor 58 is rotatably mounted on a hardened steel shaft 62 that is pinned to the engine housing adjacent the end of the camshaft 50 and within the area bounded by the outer gerotor 60. As the outer gerotor 60 rotates with the camshaft 50, it meshes with the inner gerotor 58 that, in turn, rotates around the shaft 50. Oil pumped through the intermeshing of the inner and outer gerotors 58, 60 is pumped through a bore 64 extending axially through the camshaft 50 to a pressure regulating mechanism 66 best seen in FIG. 5.

The pressure regulating mechanism 66 functions to keep the oil pressure supplied by the inner and outer gerotors 58, 60 within pre-established limits and includes a spring 68 and ball 70 located at the end 72 of the camshaft 50 opposite the inner and outer gerotors 58, 60. The ball 70 is located substantially concentrically with the longitudinal axis of the camshaft 50 and bears against the engine housing 74. The spring 68 is positioned between the ball 70 and the end 72 of the camshaft 50 so as to bias the camshaft 50 in the direction toward the inner and outer gerotors 58, 60. Preferably, a recess 76 is formed in the end 72 of the camshaft 50 to form a seat for the spring 68. A gap is provided between the extreme end of the camshaft 50 and the engine housing 74 so that the camshaft 50 can move axially against the bias provided by the spring 68.

In operation, the rotating camshaft 50 is biased toward the inner and outer gerotors 58, 60 by means of the spring 68. The oil pressure developed by the inner and outer gerotors 58, 60, however, biases the camshaft 50 toward the ball 70 thereby compressing the spring 68. As the camshaft 50 moves toward the ball 70, the outer gerotor 60 (which is attached to the camshaft 50) moves axially away from the inner gerotor 58 thereby opening a gap between the outer gerotor face and the radial face of the pump cavity. This has the effect of causing the pump to recirculate oil within the gap thereby reducing the volume of oil pumped by the inner and outer gerotors 58, 60, which has the further effect of reducing the effective oil pressure. The camshaft 50 thus assumes an radial position that balances the axial force developed by the oil pressure against the axial force developed by the spring 68. This maintains the desired oil pressure. If the oil pressure drops, the spring 68 biases the camshaft 50 to close the axial gap. This increases the oil output and raises the oil pressure. Conversely, if the oil pressure increases, the increased pressure presses the camshaft 50 toward the ball 70 against the force of the spring 68. This increases the radial gap resulting in oil recirculation, thereby reducing the oil output and reducing the oil pressure.

One advantage of the pressure regulating mechanism is that the contact point between the ball 70 and the engine housing 74 remains at substantially zero velocity as the camshaft 50 rotates. This minimizes wear and is a distinct advantage over prior spring, ball and ball seat type pressure regulating arrangements wherein wear between the ball and the seat is a significant problem. An additional advantage is that the bias provided by the spring 68 eliminates end-play noise in the camshaft 50 thereby providing quieter operation. It will be appreciated, of course, that a conventional spring, ball and ball seat type of pressure regulator can be used in place of the arrangement herein shown and described.

Figure 7:
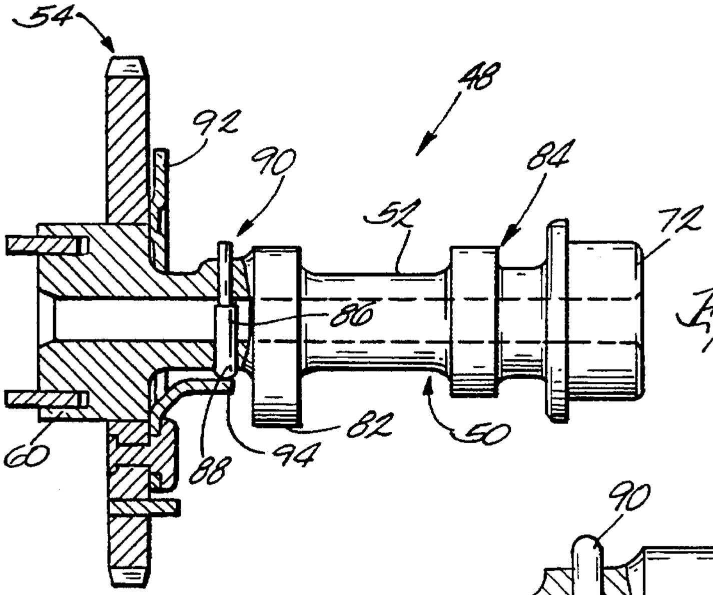
FIG. 7 is a fragmentary cross sectional view of the camshaft assembly useful in understanding the construction and operation of a compression release system constructed in accordance with one aspect of the invention.
Figure 8:
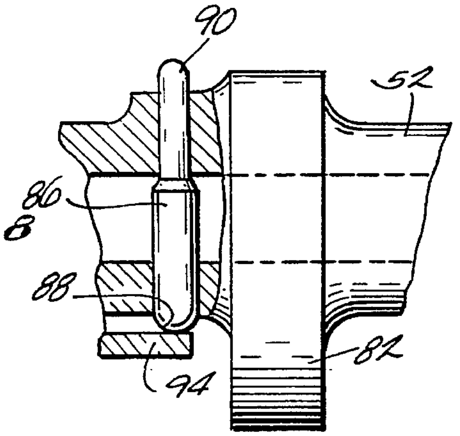
FIG. 8 is an enlarged, fragmentary sectional view of a portion of the camshaft assembly shown in FIG. 7.

In accordance with yet another aspect of the invention, the camshaft assembly 48 further includes an automatic compression release system 76 that reduces engine compression at low engine speeds to reduce cranking torque and thereby make it easier to start the engine 12. Referring to FIGS. 4, 7, and 8, the engine 12 is provided with valve lifters 78, 80 that engage the cam lobes 82, 84 formed on the camshaft 50 and control the opening and closing of the intake and exhaust valves in accordance with the position of the camshaft 50. In the illustrated embodiment, the exhaust valve is actuated by means of the valve lifter 78 that engages the cam lobe 82 nearest the camshaft gear 54. Movement of the valve lifter 78 in the upward direction as shown in FIG. 4 opens the exhaust valve while the exhaust valve closes as the valve lifter 78 moves in the downward direction. A pin 86 extends diametrically through the camshaft adjacent the cam lobe 82 that actuates the exhaust valve lifter 78. The pin 86 is axially movable relative to the camshaft 50 and is oriented so that it is aligned with the exhaust valve lifter 78 as the piston approaches top dead center on the compression stroke.

The length of the pin 86 is such that, when the piston is near top dead center and the lower end 88 of the pin 86 is held almost flush with the outer surface of the camshaft 50, the opposite or upper end. 50 projects sufficiently far above the adjacent cam lobe 82 as to slightly open the exhaust valve. If the lower end 88 of the pin 86 is not held flush and is allowed to protrude substantially beyond the outer surface of the camshaft 50, the opposite or upper end 90 does not extend above the level of the adjacent cam lobe 82 and the exhaust valve is not opened. Accordingly, by controlling the axial position of the pill 86 relative to the camshaft 50, the exhaust valve can be made to open slightly or not open as the piston approaches top dead center on the compression stroke.

In the illustrated embodiment, the axial position of the pin 86 is controlled by means of a centrifugal cam mechanism. The cam mechanism includes a cam weight 92 that is pivotally mounted at one end to the camshaft gear 54 and that includes a ramped cam surface 94 that engages the lower end 88 of the pin 86. The ramped cam surface 94 includes one segment or portion 96 that, when positioned opposite the pin, displaces the pin 86 axially so that its opposite end 90 protrudes above the level of the adjacent cam lobe surface 82. The ramped cam surface 94 also includes an additional portion 98 that, when positioned opposite the end of the pin 86, allows the pin to retract axially so that its opposite end 90 does not protrude above the level of the adjacent cam lobe surface 82. The cam weight 92 is shaped so that its mass is asymetrically disposed around the axis of the camshaft 50. Accordingly, as the camshaft 50 rotates, the cam weight 92 tends to pivot outwardly under the influence of centrifugal force. A spring 100 having one end connected to the gear 54 and another end connected to the cam weight 92 biases the cam weight 92 inwardly toward the camshaft 50.

Figure 9:
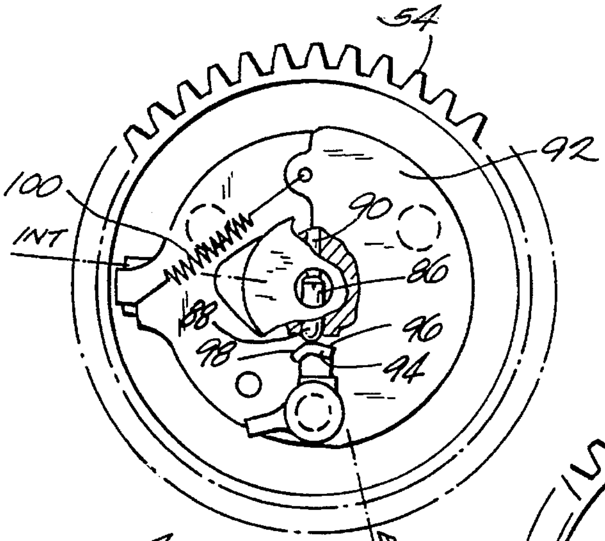
FIG. 9 is an end view of the camshaft assembly shown in FIG. 6 useful in understanding the operation of the compression release system at low engine speeds.
Figure 10:
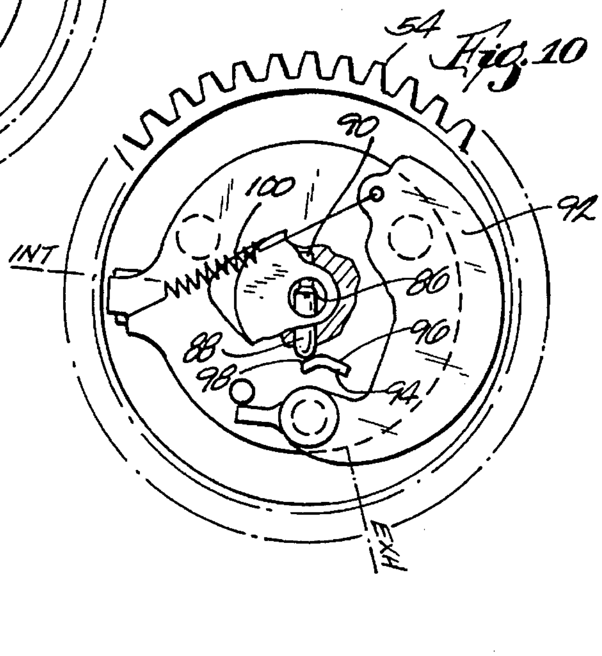
FIG. 10 is an end view of the camshaft assembly shown in FIG. 6 useful in understanding the operation of the compression release system at high engine speeds.

The operation of the automatic compression release and, more particularly, the centrifugal cam mechanism, can best be understood by reference to FIGS. 9 and 10. In FIG. 9, the engine is operating at a very low speed such as, for example, during cranking and starting. Because the centrifugal force on the cam weight 92 is minimal, the spring 100 is able to bias the cam weight 92 inwardly to the position shown. This has the effect of placing the first cam segment 96 under the pin 86, which has the effect of driving the opposite end 90 of the pin above 86 the level of the adjacent cam lobe 82. Because the pin 86 now protrudes above the level of the adjacent cam lobe 82, it has the effect of partially opening the exhaust valve as the piston approaches top dead center. This, in turn, has the effect of reducing (but not totally relieving) the compression developed in the cylinder, which, in turn, has the further effect of reducing the cranking torque. After the engine starts and gathers speed, the cam weight 92 flies outwardly against the tension of the spring 100. This has the effect of bringing the second portion 98 of the ramped cam surface 94 under the pin 86. The pin, being weight biased, will retract thereby placing the opposite end 90 of the pin 86 below the level of the adjacent cam lobe 82. With the pin 86 in this position, the exhaust valve is not opened and the engine develops maximum compression. When the engine is stopped, the centrifugal weight 92 returns to the position shown in FIG. 8.

The engine herein shown and described provides many advantages that make it suitable for use in engine driven power generating equipment. The use of dissimilar materials for the cam lobe and gear portions of the camshaft reduces engine noise and permits manufacturing economy that reduces the overall cost of the generator. The integral oil pump and oil pressure regulating mechanism are simpler, and use less material than in prior designs thereby reducing engine weight, size and cost. This is important in portable power generating equipment wherein excess size and weight are detrimental to portability. The elimination of wear in the vicinity of the valve regulator ball improves reliability and reduces maintenance, and the elimination of end-play in the camshaft results in an engine that is quieter than in earlier designs. Finally, the automatic compression release mechanism reduces the cranking torque needed to start the engine. This reduces the physical effort needed in hand start models and reduces the power and size of the starter motor needed in electric start models.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In an internal combustion engine having a cylinder, a piston mounted for reciprocation within the cylinder, a crankshaft operatively coupled through a connecting rod to the piston for rotational movement in response to reciprocation of the piston, one or more valves associated with the cylinder, and a camshaft operatively coupled to the crankshaft for actuating the valve, the improvement comprising forming the camshaft in two separate pieces, the first piece being formed of a first material and defining at least one cam lobe, the second piece being formed of a powdered metal and defining a gear for receiving motive power therethrough, said first and second pieces being joined to form a unitary structure having a cam lobe portion formed of said first material and a gear portion formed of said powdered metal.

* * * * *